US012689558B2

(12) United States Patent
Keeni

(10) Patent No.: US 12,689,558 B2
(45) Date of Patent: Jul. 21, 2026

(54) L2 SWITCH DETECTION METHOD AND PROGRAM

(71) Applicant: CYBER SOLUTIONS INC., Sendai (JP)

(72) Inventor: Glenn Mansfield Keeni, Miyagi (JP)

( * ) Notice: Subject to any disclaimer, the term of this patent is extended or adjusted under 35 U.S.C. 154(b) by 235 days.

(21) Appl. No.: 18/712,263

(22) PCT Filed: Nov. 22, 2022

(86) PCT No.: PCT/JP2022/043238
§ 371 (c)(1),
(2) Date: Nov. 6, 2024

(87) PCT Pub. No.: WO2023/095809
PCT Pub. Date: Jun. 1, 2023

(65) Prior Publication Data
US 2025/0168069 A1      May 22, 2025

(30) Foreign Application Priority Data
Nov. 24, 2021     (JP) ................................ 2021-190220

(51) Int. Cl.
*H04L 41/0853*     (2022.01)
*H04L 61/50*     (2022.01)

(52) U.S. Cl.
CPC .......... *H04L 41/0853* (2013.01); *H04L 61/50* (2022.05)

(58) Field of Classification Search
CPC .. H04L 41/0853; H04L 41/0856; H04L 61/50
See application file for complete search history.

(56) References Cited

U.S. PATENT DOCUMENTS 8,879,554 B2 * 11/2014 Emmadi ................. H04L 45/74
370/392
10,257,152 B2 * 4/2019 Wang .................... H04L 49/201
(Continued)

FOREIGN PATENT DOCUMENTS

JP        2008085532 A  *  4/2008
JP        2017108264 A  *  6/2017
(Continued)

OTHER PUBLICATIONS

ISR; Japan Patent Office; Tokyo, Japan; Dec. 23, 2022.

*Primary Examiner* — Jonathan A Bui
(74) *Attorney, Agent, or Firm* — Patshegen IP; Moshe Pinchas

(57)        ABSTRACT

The present invention is a method for detecting unregistered L2 (Layer-2) switches in a network, comprising of:
a first step of collecting switch-port information from L2 switches Sj ($1 \leq j$) registered in the management table by monitoring apparatus H,
wherein, in the management table, the MAC addresses of L2 switches Sj are registered;
a second step of detecting MAC addresses M(Zi) ($1 \leq j$) of one or more unregistered apparatuses existing between L2 switches Sx and Sy registered in the management table based on said switch-port information collected from L2 switches Sx and Sy in the first step,
wherein said MAC addresses M(Zi) are detected by identifying the MAC addresses that are contained in the collected switch-port information of both L2 switches Sx and Sy;
a third step of identifying MAC addresses M(Xk) ($1 \leq k$) of one or more L2 switches Xk from among said MAC addresses M(Zi) detected in the second step;
(Continued)

a fourth step of registering said MAC addresses M(Xk) identified in the third step in the management table.

4 Claims, 3 Drawing Sheets

(56)                    References Cited

U.S. PATENT DOCUMENTS

2016/0352622 A1 *  12/2016  Gautam .................. H04L 45/66
2020/0186452 A1 *   6/2020  Keeni ................. H04L 43/0811

FOREIGN PATENT DOCUMENTS

KR          20210119313 A  * 10/2021  ......... H04L 61/4552
WO     WO-2006118203 A1 * 11/2006  ............. H04L 41/12

* cited by examiner

[Figure 1]
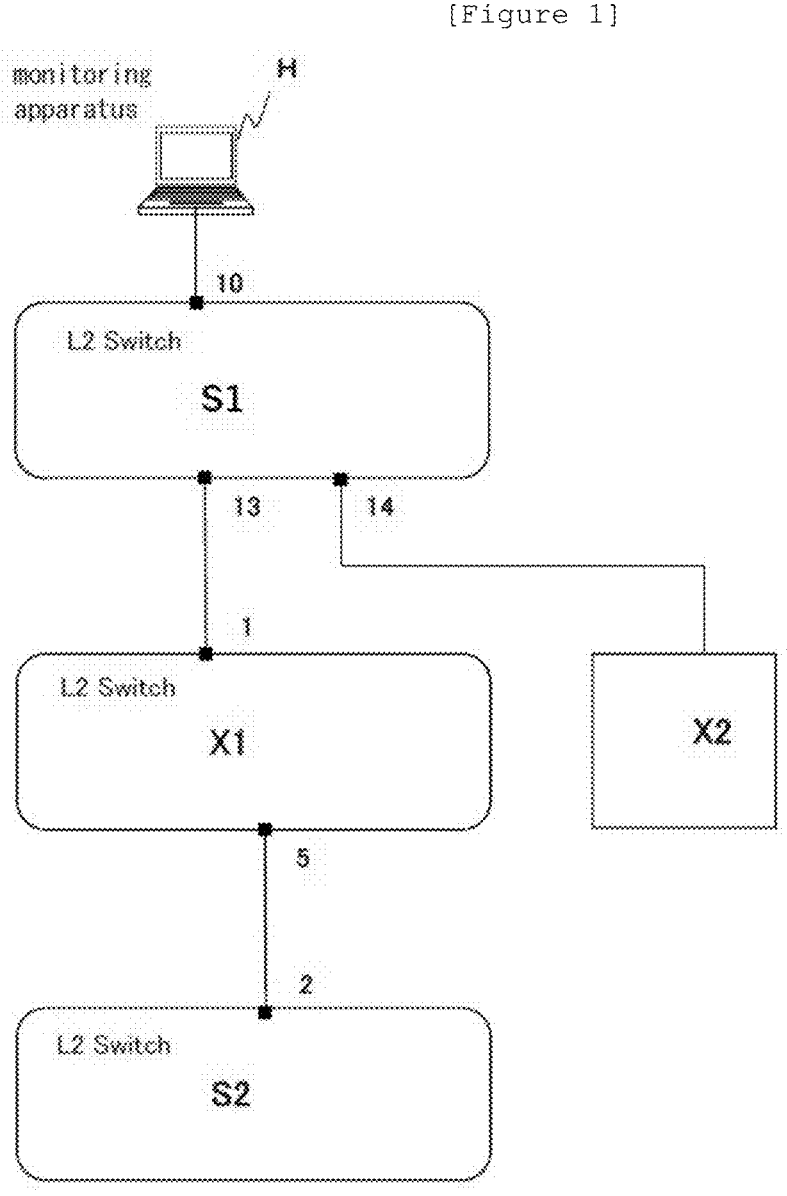

[Figure 2]
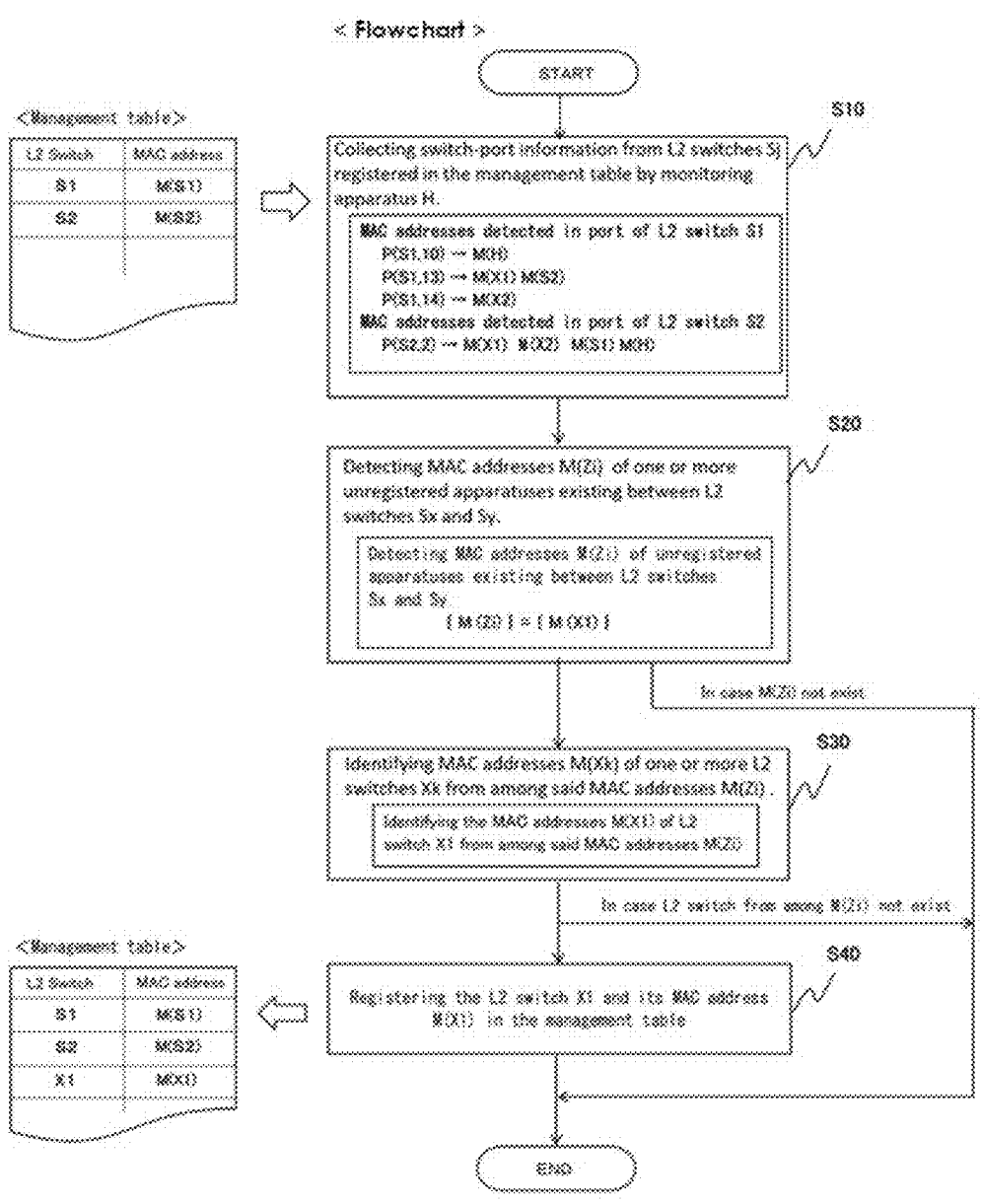

[Figure 3]

START

Extracting switch-port information P(Sx,m) and P(Sy,n).
→ P(Sx,m):switch-port information of L2 switch Sx, in which
MAC addresses M(Sy)is detected at port-number m,
→ P(Sy,n):switch-port information of L2 switch Sy, in which
MAC addresses M(Sx)is detected at port-number n.

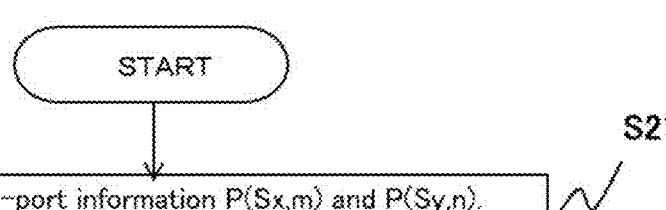

MAC addresses detected in port 13 of L2 switch S1
P(S1,13) → M(X1) M(S2)

MAC addresses detected in port 2 of L2 switch S2
P(S2,2) → M(X1) M(X2) M(S1) M(H)

S21

In case one or more MAC addresses common to
both said P(Sx,m) and said P(Sy,n) exist,
Extracting said MAC addresses as the MAC addresses of
apparatuses existing between L2 switch Sx and Sy Exracting the MAC address M(X1) common to
both P(S1,13) and P(S2,2)

[ M (Zi) ] = [ M (X1) ]

S22

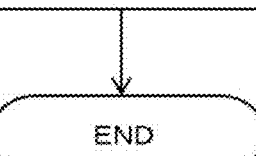

END

L2 SWITCH DETECTION METHOD AND PROGRAM

TECHNICAL FIELD

The present invention relates to a Method and a Program for detecting unregistered L2 (Layer-2) switches in a network to dynamically detect and draw connections for L2 switches as a tree-type network map.

BACKGROUND TECHNOLOGY

Recently, with the expanding scale and complexity of networks, and frequently changing configuration of network connections, it has become important for network administrators to recognize the latest information of connections between communication apparatuses in a network, to efficiently carry out network management.

To recognize the connections configuration of communication apparatuses in a network, there is a method for collecting switch-port information from L2 switches and drawing connections for L2 switches as a graphical tree-type network map.

"Patent document 1" discloses a network map creation method, which detects the information of connections between L2 switches in a network based on the MvP-table, wherein the MvP-table is created with L2 switch port number and corresponding switch MAC addresses seen on the L2 switch port, based on switch-port information collected from L2 switches. In addition, the inventor of this invention is "Keeni, Glenn Mansfield" that is the same as the inventor in the present application. Likewise, the assignee of this invention is "CYBER SOLUTIONS INC." that is the same as the assignee in the present application.

"Patent document 2" discloses a network map drawing method, which draws the information of connections between L2 switches as a graphical tree-type network map based on the MvP-table, which is created using the method disclosed in Patent Document 1, in order to recognize the information of connections between L2 switches in a network. In addition, the inventor of this invention is "Keeni, Glenn Mansfield" that is the same as the inventor in the present application. Likewise, the assignee of this invention is "CYBER SOLUTIONS INC." that is the same as the assignee in the present application.

[Paten document 1] Japanese Patent Registration No. 4653164

[Paten document 2] Japanese Patent Registration No. 6926362

DISCLOSURE OF THE INVENTION

Problem to be Solved by the Invention

As described above, it is increasingly important for efficient network management that a network administrator recognizes the latest information of the connections between communication apparatuses in a network. For instance, it enables efficient network management by drawing the latest connections as a tree-type network map.

However, there is a problem that the latest MvP-table cannot be generated in case a new L2 switch is added in a network, because the MvP-table is created based on pre-registered switch-port information in Patent document 1 and Patent document 2. That is, there is a problem that the latest network map cannot be drawn in case a new L2 switch is added in a network in Patent document 2.

To solve the above problem, the purpose of the present invention is to provide a method for detecting unregistered L2 switches in case a new L2 switch is added in a network.

Means to Solve the Problem

In order to achieve the above purpose, the invention described in Claim 1 is a method for detecting unregistered L2 (Layer-2) switches in a network, comprising of:

a first step of collecting switch-port information from L2 switches Sj ($1 \leq j$) registered in the management table by monitoring apparatus H, wherein, in the management table, the MAC addresses of L2 switches Sj have been registered;

a second step of detecting MAC addresses M(Zi) ($1 \leq j$) of one or more unregistered apparatuses existing between L2 switches Sx and Sy registered in the management table based on said switch-port information collected from L2 switches Sx and Sy in the first step, wherein said MAC addresses M(Zi) are detected by identifying the MAC addresses that are contained in the collected switch-port information of both L2 switches Sx and Sy;

a third step of identifying MAC addresses M(Xk) ($1 \leq k$) of one or more L2 switches Xk from among said MAC addresses M(Zi) detected in the second step;

a fourth step of registering said MAC addresses M(Xk) identified in the third step in the management table.

The invention described in Claim 2 is the method according to Claim 1, wherein the second step comprises of:

(1) Extracting the MAC address common to both P(Sx,m) and P(Sy,n) as the MAC addresses of one or more apparatuses existing between L2 switches Sx and Sy, wherein said P(Sx,m) is switch-port information P(Sx,m) of L2 switch Sx, in which MAC addresses M(Sy) is detected at port-number m, and said P(Sy,n) is switch-port information P(Sy,n) of L2 switch Sy, in which MAC addresses M(Sx) is detected at port-number n; and (2) Identifying the MAC addresses M(Zi) that are not registered in the management table from among the MAC addresses extracted in above (1).

The invention described in Claim 3 is a computer program embodied on a non-volatile computer readable medium of network monitoring apparatus H to execute processes for detecting unregistered L2 (Layer-2) switches in the network, comprising of:

a first executable process for collecting switch-port information from L2 switches Sj ($1 \leq j$) registered in the management table by monitoring apparatus H, wherein, in the management table, the MAC addresses of L2 switches Sj have been registered;

a second executable process for detecting MAC addresses M(Zi) ($1 \leq j$) of one or more unregistered apparatuses existing between L2 switches Sx and Sy registered in the management table based on said switch-port information collected from L2 switches Sx and Sy in the first executable process, wherein said MAC addresses M(Zi) are detected by identifying the MAC addresses that are contained in the collected switch-port information of both L2 switches Sx and Sy;

a third executable process for identifying MAC addresses M(Xk) ($1 \leq k$) of one or more L2 switches Xk from among said MAC addresses M(Zi) detected in the second executable process;

a fourth executable process for registering said MAC addresses M(Xk) identified in the third executable process in the management table.

The invention described in Claim 4 is the computer program according to Claim 3, wherein the second executable process comprises of:

(1) Extracting the MAC address common to both P(Sx,m) and P(Sy,n) as the MAC addresses of one or more apparatuses existing between L2 switches Sx and Sy, wherein said P(Sx,m) is switch-port information P(Sx,m) of L2 switch Sx, in which MAC addresses M(Sy) is detected at port-number m, and said P(Sy,n) is switch-port information P(Sy,n) of L2 switch Sy, in which MAC addresses M(Sx) is detected at port-number n; and (2) Identifying the MAC addresses M(Zi) that are not registered in the management table from among the MAC addresses extracted in above (1).

Effect of the Invention

The present invention produces the effect of being able to detect unregistered L2 switches which have been not registered in the management table, in case a new L2 switch is added in a network. Further, the present invention enables efficient network management by drawing the latest connections as a tree-type network map using the method disclosed in Patent Document 2.

BRIEF DESCRIPTION OF DRAWINGS

FIG. 1 shows an example of network configuration for carrying out "Execution Example 1" of the present invention.

FIG. 2 shows a flowchart of an example process executed to detect unregistered switches for carrying out "Execution Example 1" of the present invention.

FIG. 3 shows a flowchart of an example process executed to detect unregistered switches for carrying out "Execution Example 1" of the present invention.

BEST MODE FOR CARRYING OUT THE INVENTION

In the following, the prototype embodying best mode of the present invention is described with reference to figures. However, the present invention is not limited to this prototype.

1. Execution Example 1

The method for detecting unregistered L2 (Layer-2) switches for carrying out "Execution Example 1" of the present invention are concretely explained with reference to FIG. 1.

As shown in FIG. 1, in the network, port 10 of the L2 switch S1 is connected to the monitoring apparatus H, port 13 of the L2 switch S1 is connected to the L2 switch X1, and port 14 of the L2 switch S1 is connected to the communication apparatus X2. Further, port 1 of the L2 switch X1 is connected to the L2 switch S1, and port 5 of the L2 switch X1 is connected to the L2 switch S2. Further, port 2 of the L2 switch S2 is connected to the L2 switch X1.

The monitoring apparatus H has been keeping the management table, in which the MAC addresses of L2 switches in the network have been registered. Using the management table, it enables achieving to draw the latest connections between L2 switches in a network as a tree-type network map with the method disclosed in Patent Document 2.

Traditionally, in case a new L2 switch is added in a network, the MAC address of this L2 switch has been registered manually in the management table by a network manager. Therefore, there is a problem that the latest network map cannot be achieved to draw unless the management table has been updated manually, in case a new L2 switch is added in the network.

For instance, in the network configuration shown in FIG. 1, the monitoring apparatus H has been keeping the management table, in which the MAC addresses of L2 switches S1 and S2 have been pre-registered by the network manager. Also, L2 switch X1 is newly added in the network, and the MAC address of this L2 switch X1 has not yet been registered in the management table. Therefore, at this point, there is a problem that the latest network map cannot be achieved to draw.

Therefore, the present invention provides a method for detecting unregistered L2 switches automatically in case a new L2 switch is added in the network.

Next, an example process executed to detect unregistered switches for carrying out "Execution Example 1" of the present invention is concretely explained with reference to FIG. 2.

Here, in the network configuration shown in FIG. 1, the example process executed to detect unregistered L2 switch X1 is concretely explained.

In the step S10, the monitoring apparatus H sends a query to each L2 switch Sj ($1 \leq j$) registered in the management table, and collects switch-port information contained in the corresponding response of L2 switch Sj. Here, in the management table, the MAC addresses of L2 switches Sj have been registered.

L2 switches Sj have been keeping corresponding tables (MAC Address Tables), in which connections information of defining which ports of L2 switches Sj are connected to which apparatuses in the network by learning and remembering the MAC addresses of packets passing through ports of L2 switches Sj. Also, L2 switches Sj have been controlling to transfer Ethernet-frames by determining the destination port of L2 switches Sj based on the corresponding tables (MAC Address Tables). Further, L2 switches Sj have been controlling to transfer Ethernet-frames to all ports except the receiving port of L2 switches Sj, in case the MAC addresses of packets received in the port L2 switches Sj has not been registered in the corresponding tables (MAC Address Tables). Therefore, the monitoring apparatus H enables to collect switch-port information (MAC Address Tables) from L2 switches Sj by querying L2 switches Sj.

For instance, in the network configuration shown in FIG. 1, the monitoring apparatus H enables to collect switch-port information (MAC Address Tables) detected in ports of L2 switches S1 and S2 by querying L2 switches S1 and S2.

<Switch-Port Information of L2 Switch S1>

The MAC addresses detected in port P(S1,10): M(H)

The MAC addresses detected in port P(S1,13): M(X1), M(S2)

The MAC addresses detected in port P(S1,14): M(X2)

<Switch-Port Information of L2 Switch S2>

The MAC addresses detected in port P(S2,2): M(X1), M(X2), M(S1), M(H)

Next, in the step S20, MAC addresses M(Zi) ($1 \leq j$) of one or more unregistered apparatuses existing between L2 switches Sx and Sy registered in the management table based on said switch-port information collected from L2 switches Sx and Sy in the step S10, are detected. Here, said MAC addresses M(Zi) are detected by identifying the MAC addresses that are contained in the collected switch-port information of both L2 switches Sx and Sy. Further, in case said MAC addresses M(Zi) does not exist, the flowchart shown in FIG. 2 is ended without continuing to the next step.

Next, the process of the step S20 is more concretely explained with reference to FIG. 3. In step S21, switch-port information P(Sx,m) and P(Sy,n) is extracted, wherein said P(Sx,m) is switch-port information P(Sx,m) of L2 switch Sx, in which MAC addresses M(Sy) is detected at port-number m, and said P(Sy,n) is switch-port information P(Sy,n) of L2 switch Sy, in which MAC addresses M(Sx) is detected at port-number n.

For instance, in the network configuration shown in FIG. 1, switch-port information P(S1,13) and P(S2,2) is extracted, wherein said P(S1,13) is switch-port information P(S1,13) of L2 switch S1, in which MAC addresses M(S2) is detected at port-number 13, and said P(S2,2) is switch-port information P(S2,2) of L2 switch S2, in which MAC addresses M(S1) is detected at port-number 2.

<Switch-Port Information of L2 Switch S1>
  The MAC addresses detected in port P(S1,13): M(X1), M(S2)
<Switch-Port Information of L2 Switch S2>
  The MAC addresses detected in port P(S2,2): M(X1), M(X2), M(S1), M(H)
  Next, in the step S22,
  (1) In case one or more MAC addresses common to both said P(Sx, m) and said P(Sy,n) exists, the said MAC addresses are extracted as the MAC addresses of one or more apparatuses existing between L2 switches Sx and Sy.
  (2) Further, it is executed that identifying the MAC addresses M(Zi) that are not registered in the management table from among the MAC addresses extracted in above (1).

For instance, in the network configuration shown in FIG. 1, MAC address M(X1) common to both P(S1,13) and P(S2,2) as the MAC addresses of apparatuses existing between L2 switches S1 and S2 is extracted. Further, it is confirmed that the MAC address M(X1) is not registered in the management table. That is, {M(zi)}={M(X1)}.

Next, in the step S30, MAC addresses M(Xk) (1≤k) of one or more L2 switches Xk from among said MAC addresses M(Zi) detected in the step S20, are identified.

For instance, as a known method for confirming that a MAC address belongs to a L2 switch, the monitoring apparatus H as an SNMP (Simple Network Management Protocol) manager collects MIB (Management Information Base) information from the SNMP agent corresponding to said MAC addresses M(Zi). By examining said MIB information it is confirmed whether a MAC address in M(Zi) belong to an L2 switch Xk.

For instance, in the network configuration shown in FIG. 1, it is enables to identify the MAC addresses M(X1) of L2 switch X1 from among said MAC addresses M(Zi) by examining said MIB information. Else the MAC addresses of L2 switch from among said MAC addresses M(Zi) does not exist, the flowchart shown in FIG. 2 is ended without continuing to the next step.

Next, in the step S40, the L2 switch Xk and its MAC address M(Xk), identified in the step S30, is registered in the management table.

For instance, in the network configuration shown in FIG. 1, the L2 switch X1 and its MAC address M(X1) is registered in the management table.

As described above, the latest information of L2 switches are registered in the network in the management table, in which the MAC addresses of L2 switches have been registered by monitoring apparatus H.

For instance, the computer program which implements the step S10-S40 described in "Execution Example 1" can be configured to execute according to an instruction from network administrator.

Then, for example, the computer program can be configured to execute after a predetermined time lapse or at a predetermined time. Therefore, the present invention produces the effect of achieving efficient network management by detecting unregistered L2 switches which have been not registered in the management table, in case a new L2 switch is added in a network.

EXPLANATION OF CODES USED IN THE DIAGRAMS

H: monitoring apparatus
S1: Layer-2 switch (registered in the management table)
S2: Layer-2 switch (registered in the management table)
X1: unregistered Layer-2 switch
X2: communication apparatus

What is claimed is:
1. A method for detecting unregistered L2 (Layer-2) switches in a network, comprising:
  a first step of collecting switch-port information from L2 switches Sj (1≤j) registered in the management table by monitoring apparatus H,
  wherein, in the management table, the MAC (media access control) addresses of L2 switches Sj have been registered;
  a second step of detecting MAC addresses M(Zi) (1≤i) of one or more unregistered apparatuses existing between L2 switches Sx and Sy registered in the management table based on said switch-port information collected from L2 switches Sx and Sy in the first step,
  wherein said MAC addresses M(Zi) are detected by identifying the MAC addresses that are contained in the collected switch-port information of both L2 switches Sx and Sy;
  a third step of identifying MAC addresses M(Xk) (1≤k) of one or more L2 switches Xk from among said MAC addresses M(Zi) detected in the second step;
  a fourth step of registering said MAC addresses M(Xk) identified in the third step in the management table.
2. The method according to claim 1, wherein the second step comprises:
  (1) Extracting the MAC address common to both P(Sx,m) and P(Sy, n) as the MAC addresses of one or more apparatuses existing between L2 switches Sx and Sy, wherein said P(Sx,m) is switch-port information P(Sx,m) of L2 switch Sx, in which MAC addresses M (Sy) is detected at port-number m, and said P(Sy,n) is switch-port information P (Sy,n) of L2 switch Sy, in which MAC addresses M (Sx) is detected at port-number n; and
  (2) Identifying the MAC addresses M(Zi) that are not registered in the management table from among the MAC addresses extracted in above (1).
3. A computer program embodied on a non-transitory and non-volatile computer readable medium of network monitoring apparatus H to execute processes for detecting unregistered L2 (Layer-2) switches in a network, comprising:
  a first executable process for collecting switch-port information from L2 switches Sj (1≤j) registered in the management table by monitoring apparatus H, wherein, in the management table, the MAC addresses of L2 switches Sj have been registered;

a second executable process for detecting MAC (media access control) addresses $M(Z_i)$ ($1 \leq i$) of one or more unregistered apparatuses existing between L2 switches Sx and Sy registered in the management table based on said switch-port information collected from L2 switches Sx and Sy in the first executable process, wherein said MAC addresses $M(Z_i)$ are detected by identifying the MAC addresses that are contained in the collected switch-port information of both L2 switches Sx and Sy;

a third executable process for identifying MAC addresses $M(X_k)$ ($1 \leq k$) of one or more L2 switches Xk from among said MAC addresses $M(Z_i)$ detected in the second executable process; a fourth executable process for registering said MAC addresses $M(X_k)$ identified in the third executable process in the management table.

4. The computer program according to claim 3, wherein the second executable process comprises:

(1) Extracting the MAC address common to both P(Sx,m) and P(Sy, n) as the MAC addresses of one or more apparatuses existing between L2 switches Sx and Sy, wherein said P(Sx,m) is switch-port information P(Sx,m) of L2 switch Sx, in which MAC addresses M (Sy) is detected at port-number m, and said P(Sy,n) is switch-port information P(Sy, n) of L2 switch Sy, in which MAC addresses M (Sx) is detected at port-number n; and (2) Identifying the MAC addresses $M(Z_i)$ that are not registered in the management table from among the MAC addresses extracted in above (1).

\* \* \* \* \*